United States Patent Office 3,358,037
Patented Dec. 12, 1967

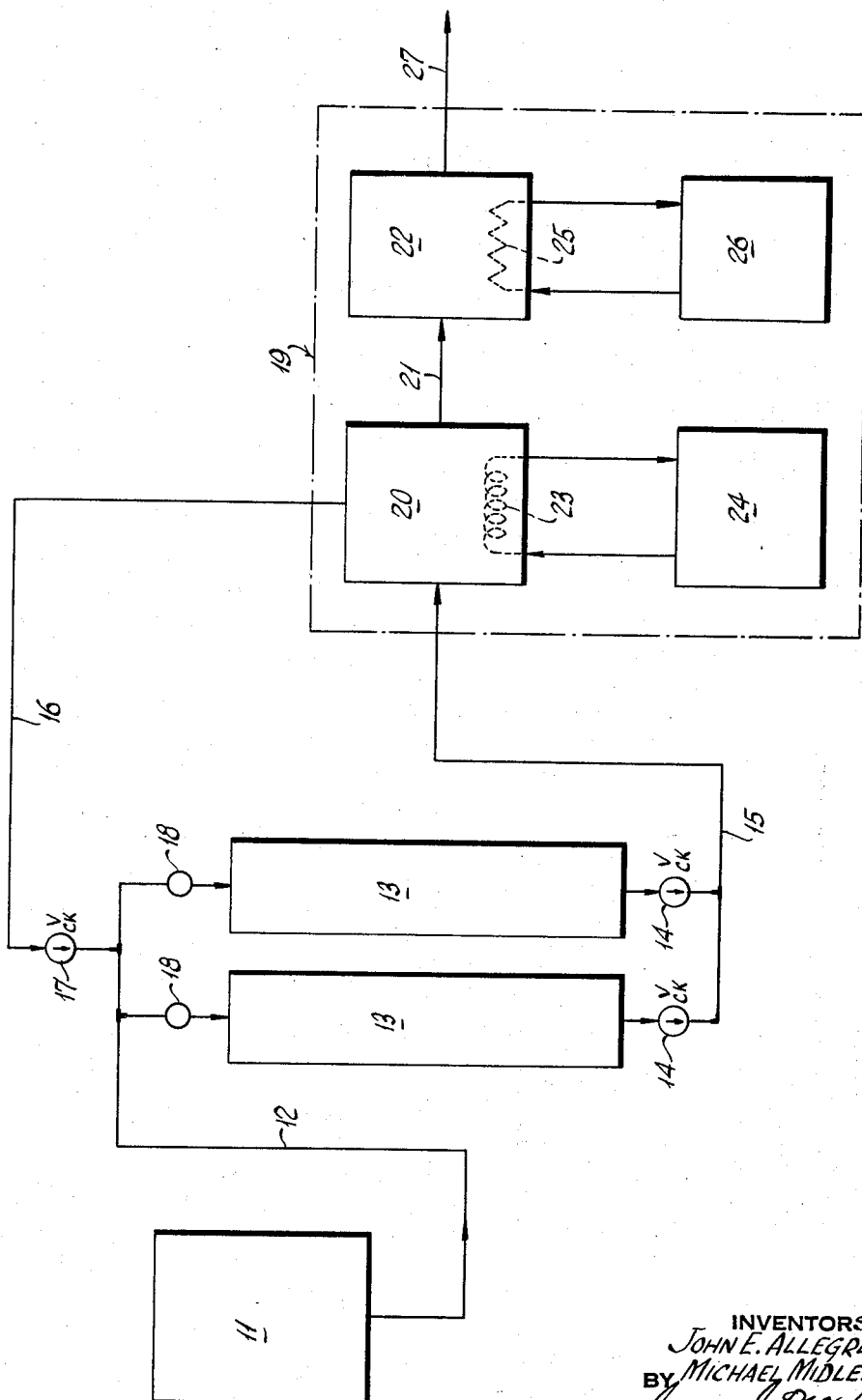

3,358,037
**CONTINUOUS FREEZING PROCESS FOR
PURIFYING DIMETHYL SULFOXIDE**
John E. Allegretti, East Brunswick, and Michael Midler,
Jr., Cranford, N.J., assignors to Merck & Co., Inc.,
Rahway, N.J., a corporation of New Jersey
Filed June 28, 1965, Ser. No. 467,380
3 Claims. (Cl. 260—607)

ABSTRACT OF THE DISCLOSURE

Dimethyl sulfoxide (DMSO) is purified to remove odor and other impurities that cause a significant U.V. absorbence, by a process in which the input DMSO that is relatively free of water is first passed through a column of activated carbon then frozen in part, while being vigorously agitated, so that the impurities remain in the liquid, unfrozen material while the frozen, solid DMSO is pure. The solid DMSO is removed and liquified as the purified output material. The unfrozen, impurity-laden DMSO is recycled to the column of activated carbon, where it is introduced thereto along with the impure, input DMSO.

---

This invention relates to a purification process and more particularly to a purification process of dimethyl sulfoxide. More specifically, it relates to the removal of pharmaceutically objectionable impurities from dimethyl sulfoxide to result in a pharamaceutically acceptable grade of dimethyl sulfoxide.

Dimethyl sulfoxide, $(CH_3)_2SO$, is a well-known chemical and has been used as a solvent for many materials in industry. The present commercial grades have been suitable for the conventional uses of dimethyl sulfoxide. A recent discovery, however, has prompted an increasing amount of activity directed toward the purification of dimethyl sulfoxide. Specifically, recently it has been reported that dimethyl sulfoxide is useful in a variety of pharmaceutical applications and particularly in the use of topical medicaments. In the latter case, it has been reported that dimethyl sulfoxide acts both as an effective drug itself and as a transcutaneous vehicle, whereby the cutaneous transmittal of a medicament is facilitated by providing the medicament in a dimethyl sulfoxide base. Currently available grades of dimethyl sulfoxide possess, to varying degrees, impurities which make them undesirable for use in pharmaceutical applications, among which is a characteristically objectionable odor which seriously affects its aesthetic quality. The impurities exist in the already purified commercially available grades of dimethyl sulfoxide at fairly low levels of concentrations, i.e. under 1%. They are undetectable using infrared spectra techniques, the spectrum being the same both for purified and unpurified materials. On the other hand, indications are that ultraviolet absorbency characeristics are particularly suitable for comparing the relative presence of the impurities.

The object of the present invention is to provide a process for continuously producing a pharmaceutically acceptable grade of dimethyl sulfoxide.

Another object of the present invention is to produce dimethyl sulfoxide by means of a continuous process that is substantially free of odor and has a low level of impurities.

Yet another object of the present invention is to provide a continuous process for treating dimethyl sulfoxide having pharmaceutically objectionable impurities to remove a substantial amount of said impurities.

A further object of the present invention is to provide a continuous process for producing pharamaceutically acceptable dimethyl sulfoxide wherein the impurity level during the continuous process remains relatively constant.

An additional object of the present invention is to provide a continuous process for purifying dimethyl sulfoxide that is simple, economical, and rapid.

Other additional objects of the present invention will become apparent to those skilled in the art by reading the following specification.

Technical grade dimethyl sulfoxide has a noxious odor generally considered to be dimethyl sulfide or some sulfur compound, although this has not been positively established, and has a U.V. absorption at 275 m$\mu$ of greater than 0.25 after purging with nitrogen. The standard for drug or pharmaceutical grade dimethyl sulfoxide has been established as being less than 0.1 and essentially odorless. Many processes have been edveloped that attempt to provide pharamaceutically acceptable dimethyl sulfoxide simply, efficiently, and economically. However, all of these processes fail in one or more of the desired aspects of this problem which faces the art.

It has now been discovered that pharameceutically acceptable dimethyl sulfoxide may be prepared simply, efficiently, and economically by a continuous freezing-melting process. The present invention of purification discovered that at the frezing point of a dimethyl sulfoxide liquid the thermodynamic equilibrium concentration of impurities in the solid state differ from the concentration of impurities in the liquid state. This behavior is described by the segregation or partition coefficient, $k$, which constant is the ratio of the concentration of impurities in the solid state to the concentration of impurities in the liquid state at equilibrium. This is expressed as follows:

$$k = \frac{C_s}{C_c}$$

wherein $k$ is the segregation or distribution constant, $C_s$ is the concentration of impurities in the solid state and $C_c$ is the concentration of impurities in the liquid state. As a liquid freezes, impurities are redistributed such that the liquid on freezing to the solid state is depleted of impurities and an enriched layer builds up in the liquid ahead of the solid-liquid interface. It is, therefore, desirable to provide a shearing force at the interface to redistribute impurities from the interface to the bulk liquid.

Under normal conditions liquid material is frozen from one end. Since the freezing action rejects impurities into the liquid state, the concentration of the solute in the liquid and that in the subsequent solids continually rise. This, of course, must be corrected in order to accomplish the objectives of the present invention. With perfect mixing in the liquid, the concentration of the impurity in the solid state in the solid-liquid interface can be expressed as follows:

$$C_s = kC_{L_0}(1-g)^{k-1}$$

wherein $C_s$ is the concentration of the impurities in the solid state; $k$ is the partition coefficient; $C_{L_0}$ is the initial impurity concentration in the liquid state and $g$ is the fractional amount of the initial liquid that is in the solid state.

Therefore, the average composition of the frozen solid state is expressed as follows:

$$C_{s_{avg.}} = \frac{C_{L_0}}{g}[1-(1-g)^k]$$

wherein all the values are the same as those expressed above.

In the continuous process of the present invention the concentration of the impurities in the liquid state is kept constant by recirculating this liquid through a carbon column while adding an amount of new unprocessed technical grade dimethyl sulfoxide equal to the amount that is frozen and removed. In this way there is no increase in the concentration of the impurities in the circulating dimethyl sulfoxide liquid state and consequently no increase of the impurities remaining in the solid state.

In the drawing, FIGURE I diagrammatically illustrates the continuous purification system of the present invention.

Referring now more particularly to the drawing in detail wherein similar reference characters designate corresponding parts throughout, there is indicated at 11 a dimethyl sulfoxide supply tank which supplies dimethyl sulfoxide through delivery pipe 12 to one of the activated carbon columns 13. The supply flow is regulated through valves 18 and check valves 14. Carbon treated dimethyl sulfoxide is supplied through delivery pipe 15 to the final purification apparatus 19, wherein carbon treated dimethyl sulfoxide is supplied to the freezing unit 20 where the desired freezing temperature is maintained by the flow of the coolant from coolant tank 24 through cooling coil 23. Upon freezing, solid dimethyl sulfoxide is transferred to melting unit 22 by transfer device 21 where the desired melting temperature is maintained by the flow of the calefactant from heating tank 26. Upon melting of the frozen dimethyl sulfoxide, liquid dimethyl sulfoxide, is then supplied through delivery tube 27. Unfrozen dimethyl sulfoxide from freezing unit 20 is returned to the activated carbon columns 13 by recycle tube 16 through check valve 17.

The continuous process of the present invention is preferably carried out by supplying an amount of technical grade dimethyl sulfoxide at a rate equal to the amount of dimethyl sulfoxide that is frozen and subsequently melted and removed, through an activated carbon column. Two or more columns may be used in parallel to allow regeneration of the activated carbon in one column without interrupting the flow through the other. The activated carbon treated dimethyl sulfoxide is then supplied to a freezing unit where freezing is accomplished amid vigorous agitation. This agitation is necessary to remove the rejected impurities at the solid-liquid interface. Otherwise high concentration of impurities will occur at this interface and such excess impurities may become entrained in the frozen dimethyl sulfoxide. The frozen dimethyl sulfoxide from which impurities have been forced to the liquid state is then transferred to a melting unit where purified dimethyl sulfoxide in liquid form is obtained. Meanwhile, part of the unfrozen, impurity-laden dimethyl sulfoxide from the freezing unit is recycled to the activated carbon columns where it is joined by a new supply of technical grade dimethyl sulfoxide in an amount equal to the amount of frozen dimethyl sulfoxide that is removed to the melting unit thereby maintaining a continuous cycling system.

As a result of carrying out the foregoing preferred steps, there is obtained dimethyl sulfoxide which has a U.V. absorbence at 275 mμ of generally less than about 0.10 with essentially no odor.

Comparison of the purified dimethyl sulfoxide produced by the process of the present invention against impure starting material or materials purified by other methods are made by using U.V. absorbence techniques and qualitative odor tests. As indicated hereinabove, other analytical techniques have not been found to be suitable. The comparison is made at a wave length of 275 mμ using water as a standard. This wave length is chosen because the U.V. absorbence curve obtained on a sample of crude dimethyl sulfoxide using the purified dimethyl sulfoxide obtained according to the instant process as a standard indicating maximum absorbence for the impurity at that point. This figure then, when used for various samples of dimethyl sulfoxide, gives a convenient reference point for determining relative purity.

The following example illustrates a method of carrying out the present invention, but it is to be understood that it is given for purpose of illustration and not of limitation.

*Example 1*

Technical grade dimethyl sulfoxide having an ultraviolet absorbence of 0.285 at 275 mμ is initially introduced into the continuous purification system of the present invention through a column 5 feet long and 1 inch in diameter containing an activated granular charcoal. The ultraviolet absorbence of the effluent dimethyl sulfoxide from the carbon column is reduced from 0.285 to 0.12 at 275 mμ. The carbon-treated dimethyl sulfoxide is then pumped continuously through the freezing unit at a rate of 700 cc. per hour where vigorous agitation is maintained. Dimethyl sulfoxide is continuously frozen at a rate of 600 cc. per hour and removed continuously to the melting unit. The melted purified liquid dimethyl sulfoxide continuously removed from the melting unit has an ultraviolet absorption of 0.09 at 275 mμ as compared to the original technical grade ultraviolet absorbence of 0.285. Concurrently, 100 cc. per hour of unfrozen dimethyl sulfoxide is continuously recycled from the freezing unit to the carbon column to join with the continuous addition of impure technical grade dimethyl sulfoxide which is added at a rate equal to that at which the frozen dimethyl sulfoxide is removed to the melting unit. The ultraviolet absorbence of the recycled unfrozen dimethyl sulfoxide at 275 mμ is 0.30. To maintain continuous operations, 2 carbon columns are connected in parallel and the flow is alternated to allow cleaning and regeneration of one column while the other is on stream.

It is essential to successful operation of the process of the present invention that the technical grade dimethyl sulfoxide which is supplied to the circulatory system of the present invention be relatively free of water. This is necessary because as the percentage of water present in dimethyl sulfoxide increases, the freezing point of dimethyl sulfoxide is drastically reduced. Therefore, if a significant amount of water were present in the technical grade dimethyl sulfoxide which is purified by the process of the present invention, it would cause considerable difficulties in the freezing stage of this method. The freezing point scale of water-containing dimethyl sulfoxide is as follows:

| Percent water | Freezing point, °C. |
|---|---|
| 0.0 | +18.45 |
| 0.1 | +18.3 |
| 0.5 | +17.4 |
| 1.0 | +16.4 |
| 1.5 | +15.4 |
| 2.0 | +14.4 |
| 3.0 | +12.3 |
| 5.0 | +6.0 |
| 10.0 | −5.5 |
| 15.0 | −19.0 |
| 20.0 | −32.0 |

From the foregoing it will be seen that there is herein provided an improved method for the purification of dimethyl sulfoxide by continuous freezing, recycling and melting which accomplishes all of the objects of the present invention and others including many advantages of great practical utility and commercial importance and acceptance.

While specific embodiments of the present invention have been named and described, it will be apparent to those skilled in the art that changes may be made in the detail shown without departing from the spirit of the present invention or the scope intended. Any departure from the above description which conforms to the present invention is intended to be included within the scope of the claims.

We claim:

1. The method of purifying liquid dimethyl sulfoxide which is relatively free of water but which has a substantial amount of impurities, as evidenced by a strong odor and a U.V. absorbence, at a wave length of 275 millimicrons, of a much greater value than 0.10 using water as a standard, comprising:

(a) passing said liquid dimethyl sulfoxide through a column containing activated carbon;

(b) chilling said liquid dimethyl sulfoxide, amid vigorous agitation, after it has passed through the activated carbon, sufficiently to freeze some of said dimethyl sulfoxide into a solid;

(c) separating the solid frozen dimethyl sulfoxide from the liquid unfrozen dimethyl sulfoxide;

(d) warming said frozen dimethyl sulfoxide and thereby obtaining as output, liquid dimethyl sulfoxide having almost no odor and a U.V. absorbence at a wave length of 275 millimicrons of less than 0.10 using water as a standard;

(e) recycling liquid unfrozen dimethyl sulfoxide from step (c), which is impurity-laden, to, and then through, the column of activated carbon used in step (a);

(f) successively repeating steps (b), (c), (d) and (e) as to the material recycled in step (e); and (g) replacing the column of activated carbon, after it has become loaded with impurities from said dimethyl sulfoxide, with a column of fresh or regenerated activated carbon;

whereby the purification system operates to furnish material having substantially no odor and a U.V. absorbence at a wave length of 275 millimicrons of less than 0.10 using water as a standard, the impurities in the input dimethyl sulfoxide are accumulated in the activated carbon and removed from the system when the impurity-loaded activated carbon is removed from the system, and there is substantially no loss of dimethyl sulfoxide.

2. The method of claim 1 in which additional untreated dimethyl sulfoxide is supplied to the column of activated carbon along with the recycled liquid unfrozen dimethyl sulfoxide.

3. The method of claim 2 in which the rate at which the untreated dimethyl sulfoxide is supplied to the column of activated carbon is equal to the rate at which the purified dimethyl sulfoxide is withdrawn from the system.

References Cited

UNITED STATES PATENTS 2,848,507    8/1958    Bennett _____ 260—707

OTHER REFERENCES

Ritchie et al.: J. Amer. Chem. Soc., vol. 84, pp. 591–594 (1962).

Kenttamaa: Suomen Kemistilehti, vol. 33, pp. 179–182 (1960).

JOSEPH P. BRUST, *Primary Examiner.*

D. PHILLIPS, *Assistant Examiner.*